Patented Apr. 24, 1951

2,550,389

UNITED STATES PATENT OFFICE 2,550,389

PROCESS FOR PRODUCING AMMONIA

Armand M. Souby, Wooster, and James C. Schiller, Baytown, Tex., assignors, by mesne assignments, to Standard Oil Development Company, Elizabeth, N. J., a corporation of Delaware No Drawing. Application March 21, 1947, Serial No. 736,410

2 Claims. (Cl. 23—198)

This invention relates to a process for producing ammonia. More particularly the invention is concerned with a process in which a catalyst is employed in synthesizing ammonia from a mixture of hydrogen and nitrogen.

Many processes have been disclosed in the prior art for synthesizing ammonia from mixtures of hydrogen and nitrogen using various types of catalyst. The well known Claude and Haber processes are directed to ammonia synthesis employing temperatures in the range of about 900° to 1100° F. in the presence of catalysts such as osmium, vanadium, iron, tungsten, and other metals or their oxides with or without promoters. These prior art synthesis methods are carried out at very high pressures such as from 200 to 1000 atmospheres in order to assure favorable thermodynamic and kinetic conditions conducive to the production of high yields of ammonia. It it known, however, that at relatively low temperatures the formation of ammonia is thermodynamically favorable even at atmospheric pressure, but with most catalysts the reaction kinetics are unfavorable for producing practical yields of ammonia at such low temperatures and pressures. Prior art workers have also found that the contact ammonia process is readily poisoned by such substances as sulfur.

It is, therefore, the main object of our invention to provide a process for synthesizing ammonia.

It is another object of our invention to synthesize ammonia under conditions of relatively low temperature and pressure in the presence of a catalyst favorable to the production of relatively high yields of ammonia.

Briefly, the present invention comprises passing a mixture of hydrogen and nitrogen over a catalyst comprising a mixture of at least one of the sulfides of the metals on the left side of the sixth group of the periodic table and of at least one of the sulfides of the iron group metals, iron, cobalt, and nickel. The reaction is carried out at temperatures ranging from about 350° to 600° F., pressures of from atmospheric to about 1000 pounds per square inch, and contact times ranging from about 100 to 1000 volumes of gaseous reactants per volume of catalyst per hour. The effluent from the reaction zone is treated in such a manner that ammonia is segregated. Since one of the chief disadvantages of the conventional ammonia synthesis operations is the fact that the extremely high pressures required necessitate the use of expensive, high pressure equipment, it is one of the chief advantages of our invention that the mixed metallic sulfide catalyst permits the production of ammonia under relatively low temperature and much lower pressures than heretofore considered commercially feasible.

The synthesis of ammonia from hydrogen or nitrogen proceeds according to the following equation:

$$N_2 + 3H_2 = 2NH_3$$

As would be expected from this equation, high pressures are generally favorable to the production of high yields of ammonia because 4 mols of reactants are required to produce 2 mols of product. On the other hand, the thermodynamics of this reaction show that at a temperature range of from about 350° to 600° F., relatively high yields of ammonia are produceable even at pressures as low as atmospheric. Such data are shown on page 362 of the book entitled "Colloid Chemistry" by H. B. Weiser, published by John Wiley and Sons, 1939 edition. We have made the surprising discovery that catalysts comprising a mixture of at least one of the sulfides of chromium, molybdenum, or tungsten with at least one of the sulfides of iron, cobalt, or nickel affect the kinetics of the above reaction such that almost theoretical yields of ammonia are produceable under relatively low pressure and temperature conditions.

In the process of the present invention a mixture of hydrogen and nitrogen in a ratio of about 3 mols of the former to 1 mol of the latter is passed over a catalyst comprising a mixture of metallic sulfides, such as nickel sulfide and tungsten sulfide, at pressures ranging from atmospheric to about 1000 pounds per square inch gauge, temperatures ranging from about 350° to 600° F., and contact times of from about 100 to 1000 volumes of gaseous reactants per volume of catalyst per hour. The process may be carried out in conventional equipment of the type described in the prior art in which the catalyst is supported in a suitable reaction zone equipped with heating means to maintain the catalyst temperature at the desired level during the reaction. The gaseous charge is preheated to the desired reaction temperature and is charged over the catalyst at a rate favorable to the production of high yields of ammonia. If pressures above atmospheric are to be employed in the reaction zone, the gaseous charge may be compressed to the desired pressure before passing over the catalyst. The effluent from the catalyst zone may be passed through a suitable compressing system or other recovery means to liquefy the ammonia and the unreacted gases may be recycled to the reaction zone. If desired, the effluent gas may be washed with a suitable solvent such as water to extract ammonia from the unreacted gases. Also, if desired, the products may be treated with a material which is chemically reactive with ammonia to remove this material from the effluent gases. As previously mentioned, the reaction equipment required in our process does not have to be of the high pressure type conventionally employed since pressures exceeding approximately 1000 pounds per square inch are seldom required.

To illustrate the beneficial results obtained by synthesizing ammonia when employing a catalyst comprising the sulfides of nickel and tungsten, the following examples are given:

Example I

A feed comprising hydrogen and nitrogen in a ratio of 3 mols of the former to 1 mol of the latter was passed over a pilled catalyst comprising 40 weight per cent of nickel monosulfide and 60 weight per cent tungsten trisulfide at a feed rate of 360 volumes of gaseous feed per volume of catalyst per hour, a temperature of from about 480° to 500° F. and atmospheric pressure. Ammonia formation was observed during the first portion of the run and continued for the entire time that the gaseous feed was passed over the catalyst, showing that the catalyst did not require a preactivation treatment. The products from the reaction were analyzed and it was found that 5.2 volume per cent of the total feed was converted to ammonia. This yield approaches the theoretical equilibrium conversion when operating at the above conditions.

Example II

In this example, a mixture of hydrogen and nitrogen was passed over the same catalyst mentioned in the previous example at atmospheric pressure and at a rate of 200 volumes of gas per volume of catalyst per hour. The mixture of hydrogen and nitrogen contained carbon monoxide as an impurity. The temperature during the reaction run was slowly raised from 350° to 550° F. Ammonia was obtained in the product. It is seen from this example that the nitrogen and hydrogen employed in the process of the present invention does not have to be pure in order to effect the production of ammonia.

It is mentioned that the catalyst may be prepared by the following procedure: Tungsten trioxide is treated with ammonium polysulfide to form ammonium thiotungstate. An aqueous solution of either nickel sulfate or nickel nitrate which is slightly acidic is mixed with the desired proportion of the ammonium thiotungstate and the pH of the mixture is adjusted slightly to the acidic side to obtain a slurry of the mixed sulfides. The slurry is decanted and the mixture is dired in a rotary kiln and pilled. The pilled material is then treated with hydrogen sulfide at an elevated temperature such as from 500° to 1000° F. to obtain the mixture of nickel and tungsten sulfides. Other methods may be employed to prepare this catalyst. For example, the oxides of the desired metals may be admixed, pilled, and subsequently sulfided at elevated temperatures with $H_2S$. The ratio of tungsten to nickel in the catalyst is not particularly critical although as a rule approximately 2 parts of tungsten to 1 part of nickel is used in the catalyst. This range may vary considerably, and an active catalyst may be prepared containing as low as 5% of either sulfide.

Since the catalyst employed in Examples I and II cited above was prepared by the first mentioned procedure whereby tungsten trioxide was reacted with ammonium polysulfide as a first step, it was desired to determine whether ammonium salts were present in the catalyst prepared from ammonium thiotungstate. This information was needed to show that such ammonium salts were not contributing ammonia to the reaction products. A portion of the catalyst was heated in an alkaline solution and the vapors evolved were passed through a standardized acid solution. The acid solution was subsequently titrated, and it was found that substantially no ammonia was contained in the catalyst as a salt. It is seen therefore that ammonia compounds in the catalyst are not responsible for the ammonia produced during the practice of our invention.

By utilizing pressures above atmospheric, it is possible to obtain even higher yields of ammonia than shown by the first example. Under some conditions it may be advantageous to employ higher pressure conditions providing equipment is available that can withstand such high pressures. One of the chief advantages of our process, however, is that it can be carried out at low pressures in relatively inexpensive equipment and at the same time almost theoretical yields of ammonia can be produced under the conditions employed.

The contact time employed in the practice of our invention will depend to a large extent on the temperature used. For example, at temperatures as low as 350° F. somewhat longer contact times are required than when using temperatures as high as 600° F. In general, a vapor space velocity of from 100 to about 1000 volumes of gaseous mixture per volume of catalyst per hour is satisfactory. Although a 3:1 molar ratio of hydrogen to nitrogen is generally preferable for the gaseous charge, this ratio may be varied over a range of from 1:1 to 6:1 and under some conditions impurities such as gaseous hydrocarbons, the carbon oxides, and other such materials may be present without interfering with the formation of ammonia. Oxygen or other active oxidizing materials should be excluded from the charge.

The present invention having been fully described and illustrated, what we wish to claim as new and useful and to secure by Letters Patent is:

1. A process for synthesizing ammonia which comprises contacting a mixture including hydrogen and nitrogen at a temperature in the range of 350° to 600° F. with a catalyst comprising a mixture of at least one of the sulfides of a metal selected from the group consisting of chromium, molybdenum and tungsten and at least one of the sulfides of the iron group metals, and recovering a product including ammonia.

2. A process for synthesizing ammonia which comprises contacting in a reaction zone a mixture of nitrogen and hydrogen at a temperature in the range of 350° to 600° F. and at a pressure in the range of atmospheric and 1000 pounds per square inch with a catalyst comprising a mixture of the sulfides of nickel and tungsten, removing reaction products from the reaction zone, and recovering ammonia from the reaction products.

ARMAND M. SOUBY.
JAMES C. SCHILLER.

REFERENCES CITED

The following references are of record in the file of this patent:

UNITED STATES PATENTS

| Number | Name | Date |
|---|---|---|
| 2,227,672 | Pier | Jan. 7, 1941 |
| 2,402,683 | Signaigo | June 25, 1946 |

OTHER REFERENCES

Mellor, Comprehensive Treatise on Inorganic and Theoretical Chemistry, vol. 8, pp. 157–159, (1928). Pub. by Longmans, Green & Co., London. (Copy in Div. 59.)

Pier, A. P. C. application S. N. 384,741, published by Alien Property Custodian, May 25, 1943, 252–230.6.